United States Patent [19]  [11] 4,335,425
Goto et al.  [45] Jun. 15, 1982

[54] DATA PROCESSING APPARATUS HAVING DIAGNOSIS FUNCTION

[75] Inventors: Humio Goto; Chikahiko Izumi; Riujiro Imai, all of Hadano, Japan

[73] Assignee: Hitachi, Ltd., Tokyo, Japan

[21] Appl. No.: 103,405

[22] Filed: Dec. 13, 1979

[30] Foreign Application Priority Data

Dec. 29, 1978 [JP] Japan .............................. 53-165216

[51] Int. Cl.³ ............................................. G06F 11/32
[52] U.S. Cl. ........................................ 364/200; 371/29
[58] Field of Search ... 364/200 MS File, 900 MS File; 371/20, 25, 27, 29; 324/73 R

[56] References Cited

U.S. PATENT DOCUMENTS 3,751,649  8/1973  Hart, Jr. ................................. 371/20
4,099,668  7/1978  Feilchenfeld et al. ........ 324/73 R X
4,125,763  11/1978  Drabing et al. ...................... 371/20

FOREIGN PATENT DOCUMENTS 1908201 10/1969 Fed. Rep. of Germany .

Primary Examiner—Raulfe B. Zache
Attorney, Agent, or Firm—Craig & Antonelli

[57] ABSTRACT

A data processing apparatus incorporating a function referred to as the scan-out diagnosis function for reading out and checking sequentially internal states of the apparatus. In addition to the address designating means for the scan-out diagnosis function, an address register is provided which is validated in place of the address designating means only when the latter is inoperative, to thereby designate a particular flip-flop. An observing means is provided for observing continuously the state of the particular flip-flop as read out. Thus, the state of the flip-flop designated by the address register can be continually visually observed independently of the address designating means for the scan-out diagnosis function.

9 Claims, 3 Drawing Figures

DATA PROCESSING APPARATUS HAVING DIAGNOSIS FUNCTION

BACKGROUND OF THE INVENTION

The present invention relates to an improvement in diagnosis of data processing systems.

It is a common practice in data processing systems that upon detection of an erroneous operation, retrial of the operation in question is executed, and when an error is again detected in the retrial operation, the error is regarded to be ascribable to the presence of a failure is the data processing system, whereby diagnosis is made in order to locate the failure after the system has been shut down or while the system is maintained operative. Of course, even when no failure is detected or located, it is necessary to perform tests for various units of the system for the purpose of maintenance and adjustments.

Heretofore, such diagnosis has been executed by leading out exteriorly from flip-flops of a data processing apparatus and connecting them to an oscilloscope to observe visually the operation of the circuits in concern. Another known diagnosis method resides in that the logic states of certain flip-flops of a processor are read out through corresponding addressing (address designation) from a maintenance panel, and the processor is operated and stopped again to read out again the states of the flip-flops in a repeated manner.

FIG. 1 illustrates a typical example of the hitherto known diagnosis.

The illustrated data processing apparatus comprises plug boards 2a, 2b and 2c installed in a package on a back board 1 and logic circuits implemented in the form of integrated circuit and packed on the plug boards 2a, 2b and 2c.

The back board 1 is constituted by a large scale printed circuit board to which several sheets or several tens of sheets of the plug boards each constituted by a smaller size printed circuit board are electrically connected. Although illustration is made only schematically for the sake of simplification, it will be understood that several tens of semiconductor integrated circuits 3a, 3b (hereinafter referred to as IC) are mounted on each of the plug boards 2. In FIG. 1, reference numeral 4 denotes input terminals of ICs 3a, 3b and numeral 5 designates output terminals. Some of the terminals 4 and 5 of the ICs 3a and 3b are mutually connected through lines 6a and 6b wired on the plug board 2a, while other are connected to terminals 7a, 7b, 7c and 7d provided on the plug board 2a. Each of the ICs 3a, 3b incorporates logic circuits (8a, 8b), (8c, 8d) constituted by a combination of logic gates and a circuit constituted by a combination of flip-flops 9.

In operation, logic signals on a micro-strip line deposited on the back board 1 are inputted to a logic combination circuit 8a of the IC 3a through the micro-strip line 6a formed on the plug board 2a and undergo a first logical processing, the results of which are held by flip-flops 9. The logic signals held in the flip-flops 9 are inputted to a combination circuit 8b in the succeeding cycle to be subjected to a second logical processing. The signals thus obtained are then inputted to a combination circuit incorporated in the IC 3b through the micro-strip line 6b wired on the plug board 2a to undergo a third logical processing, the results of which are held by flip-flops 11. In the next cycle, the logic signals held by the flip-flops 11 are subjected to fourth and fifth logical processings in combination circuits 8d and 8e, and the results are held by flip-flops 12. Then, signals from the flip-flops 12 are sent to the plug board 2b through the micro-strip line on the plug board 2a, a pin 7c and a corresponding line 13 on the back board 1 for similar processing operations.

In this manner, the flip-flops provided in the data processing apparatus serve not only to hold the results obtained from the logical processings executed by logic combination circuits but also perform the function to determine the input conditions to the logic combination circuits. Thus, the logic states of the flip-flops provide critical data for grasping the logical operations taking place in the data processing apparatus.

For this reason, it is indispensably required to check the logic states of the flip-flops in order to confirm the normal operation capability, search the cause for erroneous operation or locate the failure portions for the logical adjustment and maintenance operation.

As a method of observing the states of the flip-flops provided in the data processing apparatus, it is arranged that lines are led out from the flip-flops 9 and 11 to be connected to terminals 7a, 7b, 7c, and 7d of the plug board 2a through associated amplifiers 10a, 10b in order to allow the states of the flip-flops to be observed in terms of signal waveforms. To this end, the terminals 7 are selectively connected to an oscilloscope 14 or a logic tracer for the observation of the signal waveform. This method thus requires the leading-out of the individual flip-flops exteriorly for the visual check.

In current data processing apparatus, there is a tendency to increase the scale of logic package implemented in a plug board or a large scale integrated circuit (LSI) in order to meet the demand for a higher density package in order to attain a higher processing speed as well as to allow expansion of logical operations. On the other hand, in the light of the tendency for miniaturizing the plug board and LSI, the number of signal deriving pins which may be provided in LSI and the plug board is necessarily imposed with restriction, making it impossible to provide a large number of terminals for observation through the oscilloscope or tracer. In other words, restriction is imposed to the number of signals available for the visual observation in spite of an extremely large number of logic functions to be checked.

The fact that the number of the flip-flops the states of which can be actually observed is restricted will of course mean that an accurate diagnosis is rendered difficult because the check for a relatively large number of flip-flops has then to be made by resorting to inference or presumption.

The other hereto known diagnosis method which resides in that the operation of a data processing apparatus to be diagnosed is intermittently operated progressively on a step-by-step base in a repeated manner to thereby read out successively the states of flip-flops in sequence for each stop of the processing operations, as described hereinbefore, does not allow the observation to be effected during the operation of the processor. In other words, although the state of a flip-flop, i.e. whether logic "1" or "0" after a certain operation can be read out, it is impossible to know what kind of variation in the signal waveform took place in the transition from one logic state to the other, thus rendering satisfactory diagnosis impractical.

SUMMARY OF THE INVENTION

An object of the invention is to enable observation of internal states of a data processing apparatus to be diagnosed while the data processing apparatus is in the course of operation.

Another object of the invention is to increase the number of the internal states of a data processing apparatus for observation.

Still another object of the invention is to accomplish the diagnostic observation with a minimum quantity of hardware to be added therefor.

The subject to which the invention is directed is a data processing apparatus having a scan-out diagnosis function carried out from a maintenance panel or by using a microprogram. In this connection, the terminology "scan-out diagnosis" means a diagnostic method which comprises the steps of addressing (designation of address) certain registers (each constituted by a group of flip-flops) from hardware as provided, reading out the data of the register and checking the validity of the read-out data, and repeating sequentially the above steps. According to a general aspect of the invention, there is provided an additional address register for designating the internal locations to be observed in addition to the address register for generating the scan-out address, wherein the additional address register is so arranged as to be used exchangeably with the scan-out register. A data line for carrying the scan-out data (i.e. data obtained from the scan-out operation) is connected to an oscilloscope or a logic tracer for observation of the internal states of the data processing apparatus. In this manner, the bit state in the scan-out register can be observed.

DETAILED DESCRIPTION OF THE PREFERRED EMBODIMENTS

Figure 1:
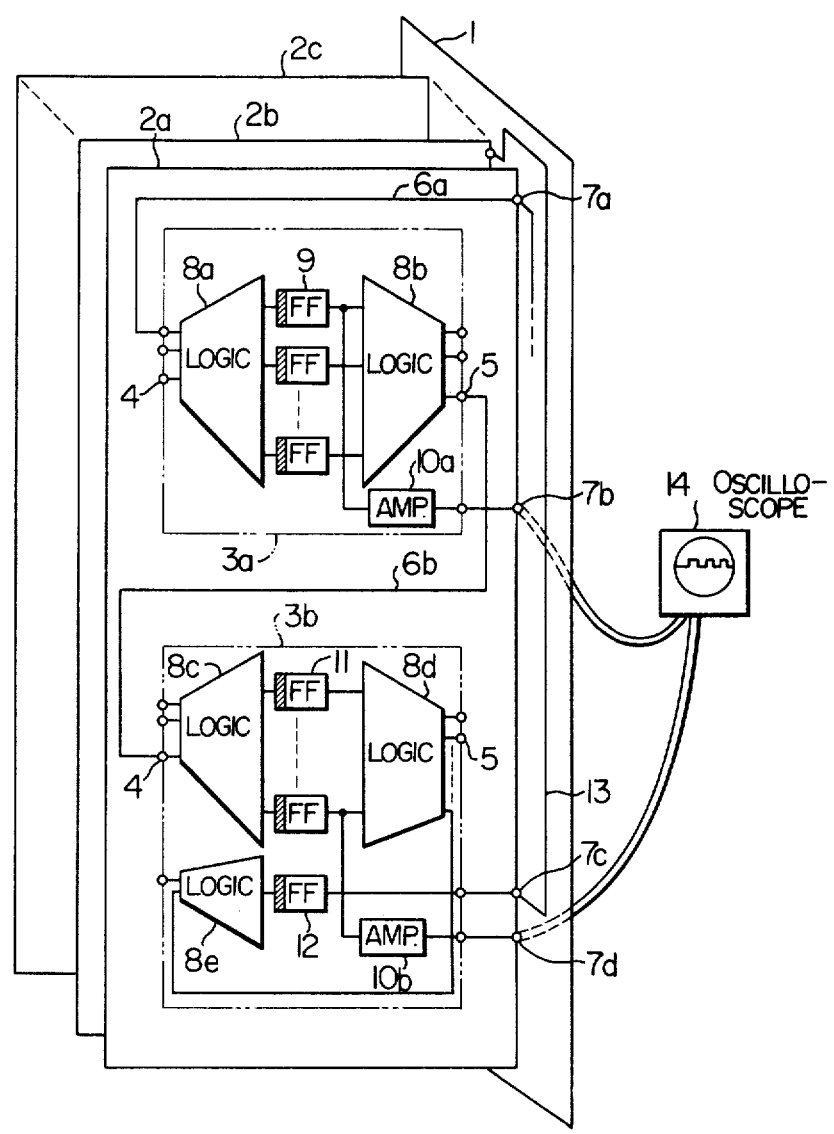
FIG. 1 is a view to illustrate a prior art diagnosis in a data processing apparatus.
Figure 2:
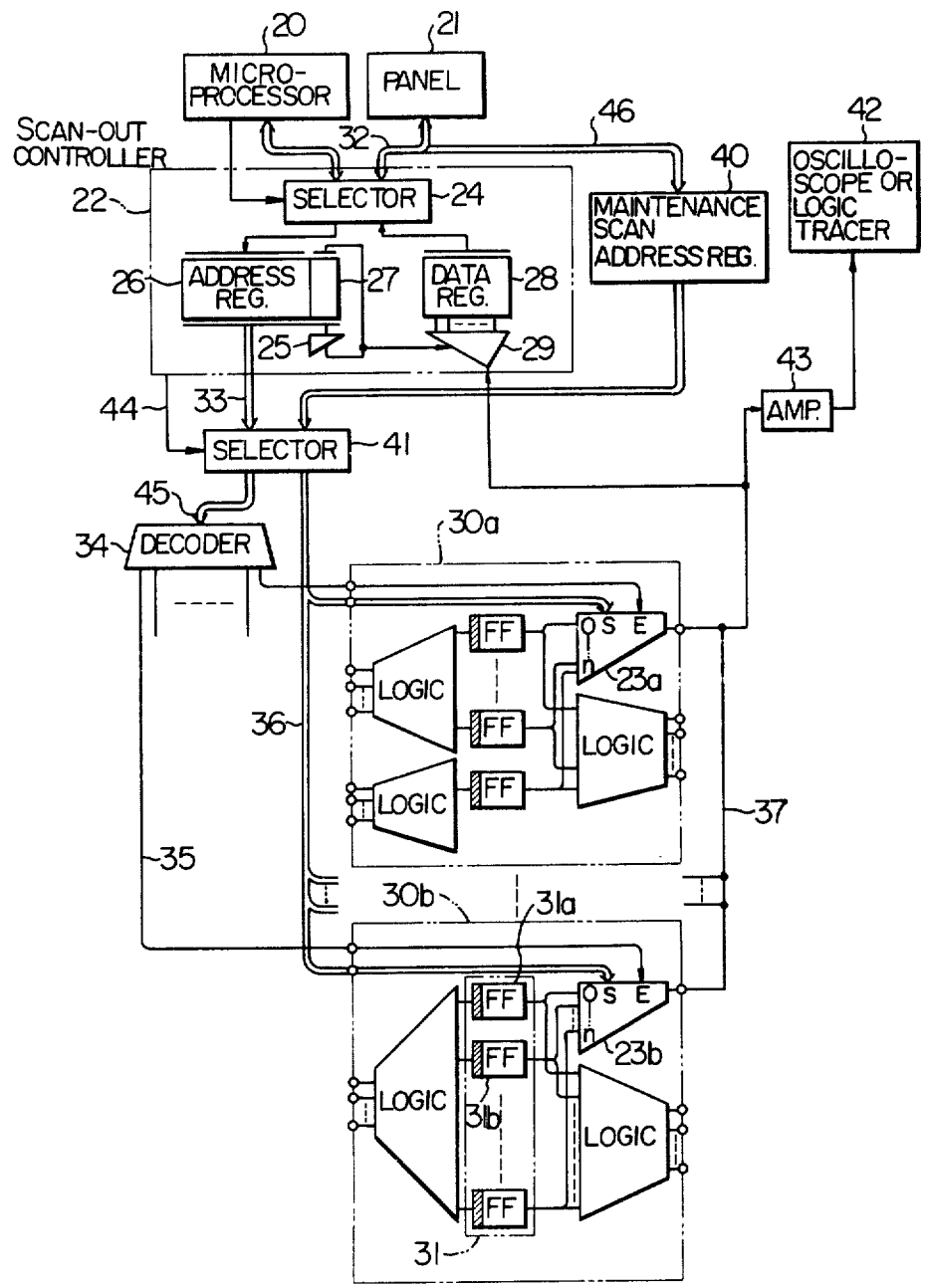
FIG. 2 is a block diagram to show an exemplary embodiment of the invention.

Some data processing apparatus exhibits a scan-out diagnosis operation which by itself has been heretofore known as one of the self-diagnosis functions of the data processing apparatus. The principle of the scan-out diagnosis will be reviewed below in brief.

As defined hereinbefore, the scan-out function resides in that a certain register is designated and data contained therein is read out for comparison with expected or anticipated data. This process is executed sequentially for a large number of registers.

More specifically, a microprocessor 20 generates sequentially addresses of registers to be scanned-out under a program control and checks whether the data as read out are the same as the expected data. A maintenance panel 21 is provided with a group of switches and a group of lamps. The addresses are prepared through ON-OFF operations of the switches, while the lamps serve to display the data as read out. It should be mentioned that in addition to the manually operated maintenance panel, there may exist a maintenance panel which incorporates therein a maintenance function effected under control of a program as referred to as the service processor.

For realizing the scan-out operation, the data processing apparatus includes a scan-out controller 22 and scan bit selectors 23. The scan-out controller 22 includes a scan word address register 26, a scan bit address counter 27, a scan-out data register 28, a selector 24, an adder 25 and a data distributing circuit 29.

ICs 30 are similar to the ICs 3 described hereinbefore in conjunction with FIG. 1 and play a part in the data processing executed by the data processing apparatus in addition to the scan-out operation.

The selector 24 serves to select either the scan-out diagnosis by the microprocessor 20 or the scan-out diagnosis made from the panel 21 and is adapted to select the diagnosis by the microprocessor 20 when the data processing apparatus is in the course of operation.

Now, it is assumed that one word is scanned out from a flip-flop group 31 under the command from the panel 21. At that time, an associated scan word address is at first set in the scan word address register 26 through a bus 32 and thereafter the scan-out operation is started. Upon the scan controller 22 being initiated, the contents in the scan word address register 26 are supplied to a word address decoder 34 through a scan word address bus 33, whereby a scan word selecting signal 35 is generated to validate the scan bit selector 23b. At the same time, the contents in the scan bit counter 27 is transferred to the scan bit selectors 23 through a scan bit address bus 36. Subsequently, the up-counting is initiated in the scan bit counter 27 which serves to designate bits in the word designated by the scan word address on the bit-by-bit base. Assuming that one word contains eight bits, the counter 27 may be constituted by a 3-bit counter and updated on the bit-by-bit base by the adder 25 from the state "000" to "111".

Connected to the scan bit selectors 23 are outputs from the individual flip-flops. When a certain scan bit selector is selected by a corresponding scan word address, one of the flip-flops is selected in dependence on the contents of the scan bit counter 27, whereby the value of the selected bit is outputted to the scan-out data bus 37.

Simultaneously with the up-counting operation of the scan bit counter 27, the states of the flip-flops corresponding to one word contained in the flip-flop group 31 are selectively and sequentially outputted to the scan-out data bus 37 and sequentially set at the associated bits of the scan-out data register 28. Upon completion of the scan-out operation for one word, the contents of the scan-out data register 28 are latched through the bus 32 under the command issued from the panel 21, thereby to allow the scan-out operation for the flip-flop group 31.

As will be appreciated from the foregoing, the scan-out diagnosis is carried out by reading out the registers and bits sequentially.

However, the diagnosis described above so far is not adequate for the reasons described hereinbefore. Observation of a certain bit is also required during the operation of the data processing apparatus, because then possible transient change in the state of a flip-flop, e.g. whether the flip-flop is consistently in the state "0" or the flip-flop took temporally the "1" state and is reset to "0", can be identified to facilitate the location of the failure.

By the way, in the scan-out diagnosis operation, different registers are sequentially designated to check the states thereof. Further, even when a register is fixedly designated, the scan-out controller will change sequentially the bits as designated. Thus, it is impossible to observe continuously the state of one and the same bit (or flip-flop). Besides, even when an arrangement is made such that the scan-out address register and the single bit are designated in common, the contents in the scan-out register will be lost when the bit state is observed.

With the present invention, it is contemplated to carry out the bit observation by making use of a part of the scan-out function, wherein the observation is performed during the interval between the successive scan-out operations or during the absence of the scan-out diagnosis function with the logic circuits being in the operative state.

According to the invention, with a view to attain the intended objects, there are provided independently from the scan-out controller 22 used for the usual scan-out operation, a maintenance scan address register 40 for allowing the scan word address and the scan bit address to be set from the panel, a scan address selector 41 for sending out the contents of the maintenance scan address register 40 to the scan address bus when the usual scan-out operation is not performed, and connecting terminals for coupling the scan-out data as read out on the scan-out bus to the observing apparatus. By setting at the maintenance scan address register 40 the scan addresses for the flip-flops which require observation for maintenance and adjustment, it is possible to display and observe the variation in the logic state of given signals with the aid of an oscilloscope or a logic tracer.

Since neither the scan word address nor the scan bit address set at the maintenance scan address register 40 will undergo change, the contents held in a specific flip-flop designated by the associated address can be displayed on an image screen of an oscilloscope, whereby the logic signal which varies its state from time to time can be observed by the operator.

In order to perform the scan operation for one byte, the scan-out controller 22 designates a particular flip-flop group corresponding to eight bits by using the scan word address and then designates the 0-th to 7-th bits by operating the scan bit counter 27 to count up from "000" to "111".

On the other hand, the maintenance scan address register 40 designates the flip-flop group corresponding to the eight bits by means of the scan word address and then designates by the scan bit address only those flip-flops that are in the states corresponding to the particular bits among the eight bits. In other words, not only the word address but also the bit address are designated from the panel 21. The addressing is effected through the corresponding switch operations on the panel.

When a scan-busy signal is generated from the scan-out controller 22 (in the scan-out operation mode), the scan word address and the scan bit address are sent out to a maintenance scan address bus from the maintenance scan address register 40. The scan address selector 41 sends out the scan word address to the scan address bus 45 and the scan bit address to the scan address bus 36. Further, the scan address selector 41 will select either the addresses sent out from the scan word address register 26 and the scan bit address counter 27 through the scan address bus 33 or the addresses sent out from the maintenance scan address register 40 through the maintenance scan address bus.

Assuming now that the state of the flip-flop 31a is to be observed by the oscilloscope or logic tracer 42, the maintenance scan word address and the maintenance scan bit address of the flip-flop 31a are set at the maintenance scan address register 40 from the panel 21 through a data bus 46.

In the normal operation, i.e. unless the scan-out operation is performed by the scan-out controller 22, the scan busy signal is logic "0". Thus, the maintenance scan word address and the maintenance scan bit address are sent out to the scan word address bus 45 and the scan bit address bus 36, respectively, through the scan address selector 41.

The maintenance scan word address causes a scan word address decoder 34 to generate a scan word selecting signal 35 for the flip-flop group 31 to which the flip-flop 31a belongs, to thereby validate the scan bit selector 23b. At the same time, the maintenance scan bit address is supplied to the scan bit selector 23b, whereby the flip-flop 31a is selected by the scan bit selector 23b, to thereby cause the state signal representative of the state of the flip-flop 31a to be sent out to the scan out data bus 37. The state signal of the flip-flop 31a as outputted to the scan-out data bus 37 is transmitted to the oscilloscope or the logic tracer 42 through a gate amplifier 43. Thus, the variation in the state of the flip-flop 31a can be visually observed on the oscilloscope or logic tracer 42.

In this manner, the necessity for increasing the number of the external connection pins can be eliminated with the external pins corresponding to the scan bit selectors 23 being provided to lead out externally to the plug board and the back board. Only the external pin for inputting the scan bit address is additionally required.

Further, since the state signal of the flip-flops 31a is read out to the scan data register 28 of the scan-out controller 22, the diagnosis can be executed by making use of this fact.

As will be appreciated from the foregoing description, all the flip-flops capable of being scanned-out can be observed according to the teaching of the invention, whereby the number of the flip-flops whose state can be visually observed is significantly increased to assure more accurate maintenance and adjustment operations. Further, because the external pins need not be increased in number, the package density (gate/pin ratio) is prevented from being lowered, while a large number of the flip-flops can be checked without exerting any adverse influence to the logic operations performed at a high processing speed. Further, for the observation of the states of different flip-flops, the probe position on the oscilloscope or the logic tracer need not be altered, but merely the set value of the maintenance scan address register needs to be renewed. Thus, the efficiency in the maintenance and adjustment operations can be significantly enhanced.

Figure 3:
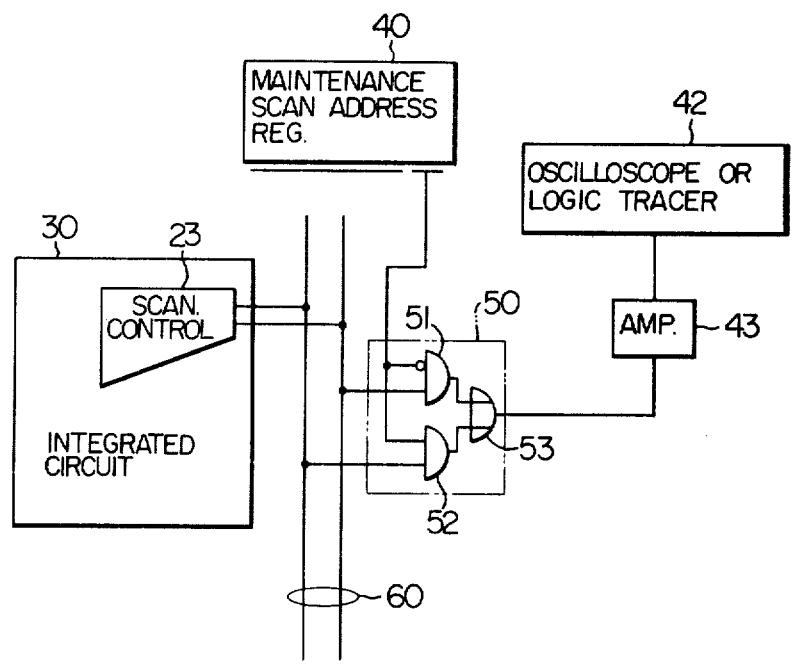
FIG. 3 shows another embodiment of the invention.

FIG. 3 shows another embodiment of the invention, in which a scan-out data bus 60 is constituted by a pair of data lines so that the scan bit selector 23 may select the state outputs from two flip-flops at a time to send out them to the scan-out data lines 60. For the simultaneous selection of two bits, the bits of the bit address except for the least significant bit may be selected. In the case of the data processing apparatus of this type scan-out function, only a bit selector 50 is required to be provided additionally, which receives the least significant bits from the maintenance scan address register 40, whereby either one of the bits is selected to be supplied to the oscilloscope 42. In concrete, one of AND gates 51 and 52 is gated by the least significant bit while the other is gated by the complementary bit.

What is claimed is:

1. A data processing apparatus having flip-flop circuits with a self-diagnosis function to permit diagnosis of internal states of operation of the data processing apparatus while the data processing apparatus is in the course of operation comprising:
   (a) scan-out controlling means for generating a first scan-out address which designates first groups of said flip-flop circuits and receiving scan-out data which are outputs of flip-flop circuits designated by said first scan-out address, each of said first groups consisting of a plurality of second groups of said flip-flop circuits,
   (b) an address generating circuit receiving said first scan-out address and generating in sequence second scan-out addresses for said second groups of each of said first groups designated by said first scan-out address,
   (c) bit address generating means for generating a bit address which designates one of said flip-flop circuits,
   (d) selector means selecting one of said second scan-out address and said bit address,
   (e) outputting means responsive to said selector means for outputting outputs of said flip-flop circuits,
   (f) transfer means for transferring said outputs to said scan-out controlling means, and
   (g) observing means for observing said outputs.

2. The data processing apparatus according to claim 1, wherein said second group includes a single flip-flop circuit.

3. The data processing apparatus according to claim 1, wherein said second group includes a plurality of flip-flop circuits,
   said outputting means provides a plurality of outputs of one of said second groups at the same time, and
   said observing means has a bit selector which responds to a part of said bit address and selects one of said plurality of outputs.

4. The apparatus according to claim 1, wherein said selector means is operative to select the bit address from the bit address generating means only during periods when the scan-out controlling means is inoperative.

5. The apparatus according to claim 4, wherein said selector means repeatedly selects said bit address during periods in which the scan-out controlling means is inoperative so that the observing means can continually monitor the state of the flip-flop designated by said bit address.

6. A data processing apparatus comprising logic circuits with flip-flop circuits therein and a self-diagnosis circuit for effecting self-diagnosis of internal states of the data processing apparatus while the data processing apparatus is in the course of operation, said self-diagnosis circuit comprising:
   (a) scan-out control means coupled to a microprocessor and a maintenance panel to generate a first scan-out address which designates one of groups of said flip-flop circuits and adapted to receive scan-out data from the flip-flop circuits of the group designated by said first scan-out address,
   (b) address generating circuits supplied with said first scan-out address for generating second scan-out addresses bit by bit for the flip-flop circuits of the group designated by said first scan-out address in sequence,
   (c) a maintenance scan address register settable by said maintenance panel and constantly generating a bit address which designates a specified one of said flip-flop circuits,
   (d) selection means for selecting one of said second scan-out addresses and said bit address,
   (e) output means responsive to the output of said selection means for providing outputs of said flip-flops, and
   (f) transfer means for transferring the outputs from said output means to said scan-out control means to allow read-out of the states of the designated flip-flop circuits through said panel.

7. The apparatus according to claim 6 further comprising an observing means coupled to said transfer means for observing the outputs from said output means.

8. The apparatus according to claim 6, wherein said selection means is operative to select the bit address from the maintenance scan address register only during periods when the scan-out control means is inoperative.

9. The apparatus according to claim 8, wherein said selection means repeatedly selects said bit address during periods in which the scan-out control means is inoperative so that said transfer means can provide read-outs through said panel to permit continually monitoring the state of the flip-flop designated by said bit address.

* * * * *